United States Patent
Everly et al.

(10) Patent No.: US 10,159,114 B2
(45) Date of Patent: Dec. 18, 2018

(54) LAYERED HEATER SYSTEM WITH HONEYCOMB CORE STRUCTURE

(75) Inventors: Mark Everly, St. Charles, MO (US);
Cal Swanson, St. Louis, MO (US);
Tom Kupiszewski, St. Louis, MO (US);
Kevin Ptasienski, O'Fallon, MO (US);
Chris Lanham, O'Fallon, MO (US);
Mike Stewart, Washington, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1669 days.

(21) Appl. No.: 12/405,722

(22) Filed: Mar. 17, 2009

(65) Prior Publication Data

US 2009/0236327 A1 Sep. 24, 2009

Related U.S. Application Data

(60) Provisional application No. 61/037,549, filed on Mar. 18, 2008.

(51) Int. Cl.
*H05B 3/10* (2006.01)
*H05B 3/26* (2006.01)
*F24D 13/02* (2006.01)

(52) U.S. Cl.
CPC ........... *H05B 3/265* (2013.01); *F24D 13/02* (2013.01); *F24D 13/022* (2013.01); *Y02B 30/26* (2013.01)

(58) Field of Classification Search
CPC ....... F24D 13/02; F24D 13/022; H05B 3/265; H05B 3/10; H05B 3/16; H05B 3/18; H05B 3/20; H05B 3/28; Y02B 30/26

USPC ........ 219/260, 261–270, 541–544, 546–548, 219/552–553; 123/143 R–143 C
See application file for complete search history.

(56) References Cited

U.S. PATENT DOCUMENTS

| | | | | |
|---|---|---|---|---|
| 4,743,740 | A * | 5/1988 | Adee | 219/548 |
| 5,219,302 | A * | 6/1993 | Robertson et al. | 439/404 |
| 5,513,075 | A * | 4/1996 | Capper et al. | 361/773 |
| 6,472,043 | B1 * | 10/2002 | Kobayashi et al. | 428/116 |
| 6,834,159 | B1 | 12/2004 | Schramm | |

(Continued)

FOREIGN PATENT DOCUMENTS

| | | |
|---|---|---|
| JP | 64089272 | 4/1989 |
| JP | 7037680 | 2/1995 |

(Continued)

OTHER PUBLICATIONS

International Search Report and Written Opinion for corresponding PCT/US2009/037389, dated Jul. 22, 2009, pp. 1-14.

*Primary Examiner* — Michael G Hoang
(74) *Attorney, Agent, or Firm* — Burris Law, PLLC

(57) ABSTRACT

A layered heater system is provided that includes an engineered substrate having an upper face sheet, a lower face sheet, and a core disposed between the upper face sheet and the lower face sheet. A dielectric layer is formed on at least one of the upper face sheet and the lower face sheet, a resistive element layer is formed on the dielectric layer, a protective layer is formed on the resistive element layer, and terminal pads are formed over at least a portion of the resistive element layer, wherein the terminal pads are exposed through the protective layer. In one form, the core defines a honeycomb structure, and in another, the core defines a frame structure having a plurality of support ribs.

10 Claims, 20 Drawing Sheets

(56) References Cited

U.S. PATENT DOCUMENTS

| | | | |
|---|---|---|---|
| 7,196,295 B2* | 3/2007 | Fennewald et al. | 219/543 |
| 7,581,958 B2 | 9/2009 | Swanson et al. | |
| 7,601,935 B2* | 10/2009 | Fennewald et al. | 219/543 |
| 7,678,343 B2* | 3/2010 | Carmello et al. | 422/177 |
| 8,061,402 B2* | 11/2011 | Forbis et al. | 156/489 |
| 8,070,899 B2* | 12/2011 | Forbis et al. | 156/187 |
| 8,089,337 B2* | 1/2012 | Brummell et al. | 338/204 |
| 2003/0122489 A1* | 7/2003 | Mizoziri et al. | 313/613 |
| 2004/0211771 A1* | 10/2004 | Crandell | 219/544 |
| 2006/0065654 A1* | 3/2006 | Ptasienski | 219/543 |
| 2006/0112553 A1* | 6/2006 | Badding et al. | 29/890 |
| 2006/0249501 A1* | 11/2006 | Hung et al. | 219/390 |
| 2007/0184700 A1 | 8/2007 | Swanson et al. | |
| 2007/0278213 A2 | 12/2007 | McMillin et al. | |
| 2008/0182067 A1* | 7/2008 | Shen et al. | 428/117 |
| 2011/0180527 A1* | 7/2011 | Abbott | 219/450.1 |

FOREIGN PATENT DOCUMENTS

| | | | |
|---|---|---|---|
| JP | 2005133308 | 5/2005 | |
| TW | M300940 | 11/2006 | |
| WO | WO 01/17850 | 3/2001 | |
| WO | WO0117850 A1 * | 3/2001 | B32B 15/04 |

* cited by examiner

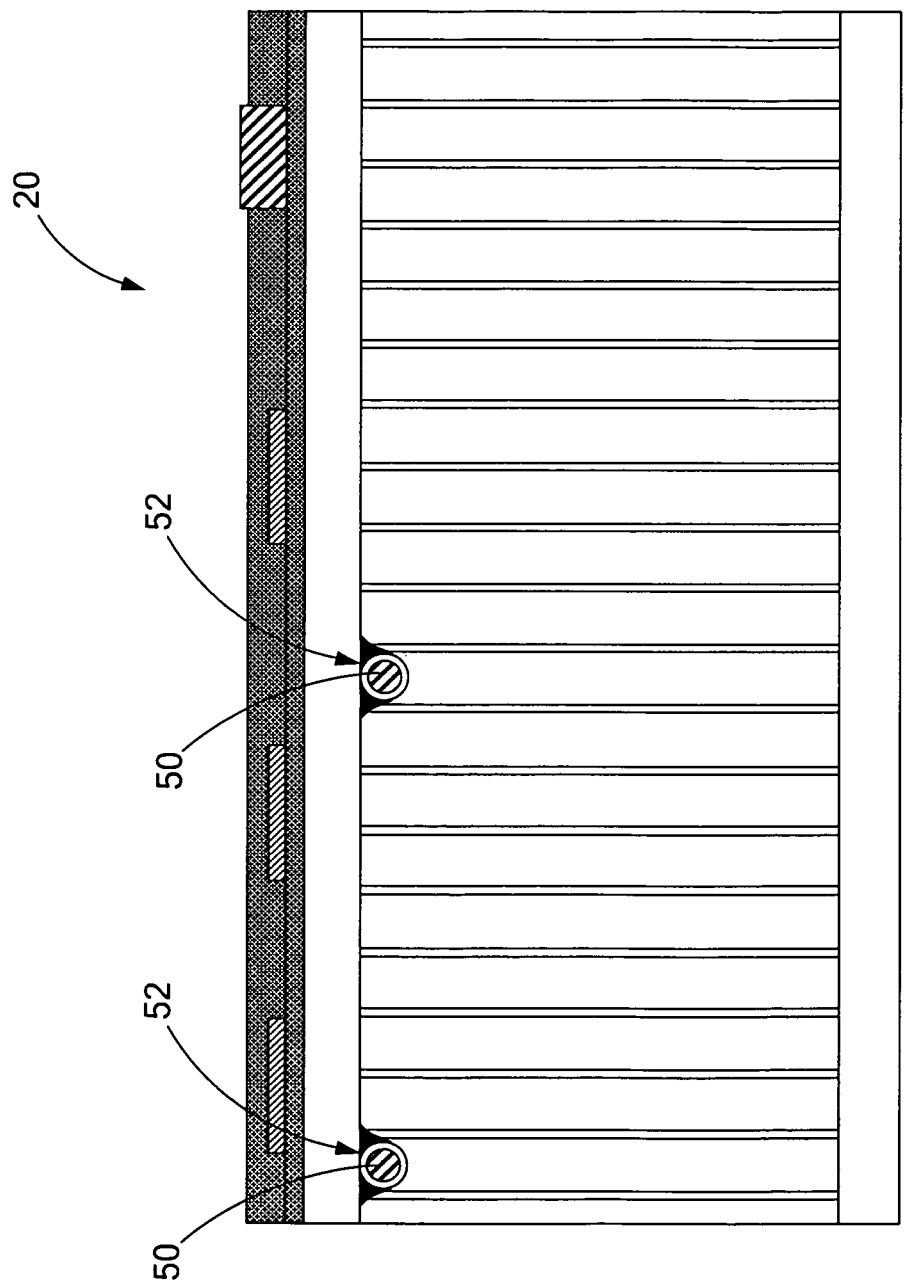

LAYERED HEATER SYSTEM WITH HONEYCOMB CORE STRUCTURE

CROSS-REFERENCE TO RELATED APPLICATIONS

This application is based upon U.S. Provisional Patent Application Ser. No. 61/037,549, entitled "Layered Heater System With Honeycomb Core Structure," filed Mar. 18, 2008, the contents of which are incorporated herein by reference in their entirety and continued preservation of which is requested.

FIELD

The present disclosure relates generally to resistive heaters and more particularly to layered heaters for use in relatively large flat panels.

BACKGROUND

The statements in this section merely provide background information related to the present disclosure and may not constitute prior art.

Resistive devices such as layered heaters are typically used in applications where space is limited, when heat output needs vary across a surface, or in ultra-clean or aggressive chemical applications. A layered resistive device, such as a layered heater, generally comprises layers of different materials, namely, a dielectric and a resistive material, which are applied to a substrate. The dielectric material is applied first to the substrate and provides electrical isolation between the substrate and the resistive material and also minimizes current leakage during operation. The resistive material is applied to the dielectric material in a predetermined pattern and provides a resistive heater circuit. The layered heater also includes leads that connect the resistive heater circuit to a heater controller and an overmold material that protects the lead-to-resistive circuit interface. Accordingly, layered load devices are highly customizable for a variety of applications.

Individual layers of the resistive devices can be formed by a variety of processes, one of which is a "thick film" layering process. The layers for thick film resistive devices are typically formed using processes such as screen printing, decal application, or film printing heads, among others. Some thick film layered heaters are employed in relatively large flat panels, such as those used in preheat cabinets for a plasma enhanced chemical vapor deposition (PECVD) process. In these cabinets, several heater shelves are employed, which heat substrates for the PECVD process, and are relatively large in size and thus are relatively heavy. As such, the heater substrates often deflect, or sag, under their own weight, which affects thermal performance of the overall system. Additionally, the heater substrates may exhibit a certain degree of warpage after a thick film manufacturing process if coefficients of thermal expansion of the layered heater materials and the substrate are not properly matched, or due to other manufacturing variations. An additional issue related to such heater substrates is that of creep, especially at elevated temperatures.

Additionally, these heater substrates in the art do not allow for heat transfer control from one shelf of heater substrates to the next. Since the opposing faces of heater substrates are not thermally isolated from each other, heat is transferred from one heater substrate to the next, which can be both beneficial and detrimental, depending on the desired operating characteristics. Moreover, isolation of electrical connections to the heater in a vacuum environment to prevent accidental discharge of electricity is often challenging in such applications.

SUMMARY

In one form, the present disclosure provides a layered heater system comprising an engineered substrate having an upper face sheet, a lower face sheet, and a core disposed between the upper face sheet and the lower face sheet. A dielectric layer is formed on at least one of the upper face sheet and the lower face sheet, a resistive element layer is formed on the dielectric layer, a protective layer is formed on the resistive element layer, and terminal pads are formed over at least a portion of the resistive element layer, wherein the terminal pads are exposed through the protective layer. In one form, the core defines a honeycomb structure, and in another, the core defines a frame structure having a plurality of support ribs.

In another form of the present disclosure, a layered heater system comprises an engineered substrate having an upper face sheet, a lower face sheet, and a core disposed between the upper face sheet and the lower face sheet. A heater plate is disposed on at least one of the upper face sheet and the lower face sheet, and a dielectric layer is formed on the heater plate. A protective layer is formed on the resistive element layer, and terminal pads are formed over at least a portion of the resistive element layer, wherein the terminal pads are exposed through the protective layer. In one form, the core defines a honeycomb structure, and in another, the core defines a frame structure having a plurality of support ribs.

In still another form, a layered heater system is provided that comprises an engineered substrate comprising an upper face sheet, a lower face sheet, and a core disposed between the upper face sheet and the lower face sheet. A dielectric layer is formed proximate least one of the upper face sheet and the lower face sheet, a resistive element layer is formed on the dielectric layer, and a protective layer is formed on the resistive element layer. Terminal pads are formed over at least a portion of the resistive element layer, wherein the terminal pads are exposed through the protective layer.

Various electrical interconnects for use in connecting terminal pads of the layered heater system to a power supply in a vacuum environment are also provided. Such an environment may also include the introduction of plasma into the vacuum environment, for which the present disclosure is also intended for use.

Further areas of applicability of the present disclosure will become apparent from the detailed description provided hereinafter. It should be understood that the detailed description and specific examples, while indicating the embodiments of the disclosure, are intended for purposes of illustration only and are not intended to limit the scope of the disclosure.

BRIEF DESCRIPTION OF THE DRAWINGS

The present invention will become more fully understood from the detailed description and the accompanying drawings, wherein:

FIG. 5 is a cross-sectional view of the layered heater system having a temperature sensor and constructed in accordance with the principles of the present disclosure;

Corresponding reference numerals indicate corresponding parts throughout the several views of the drawings, and the drawings are not to scale.

DETAILED DESCRIPTION

The following description of the embodiments is merely exemplary in nature and is in no way intended to limit the disclosure, its application, or uses.

Figure 1:
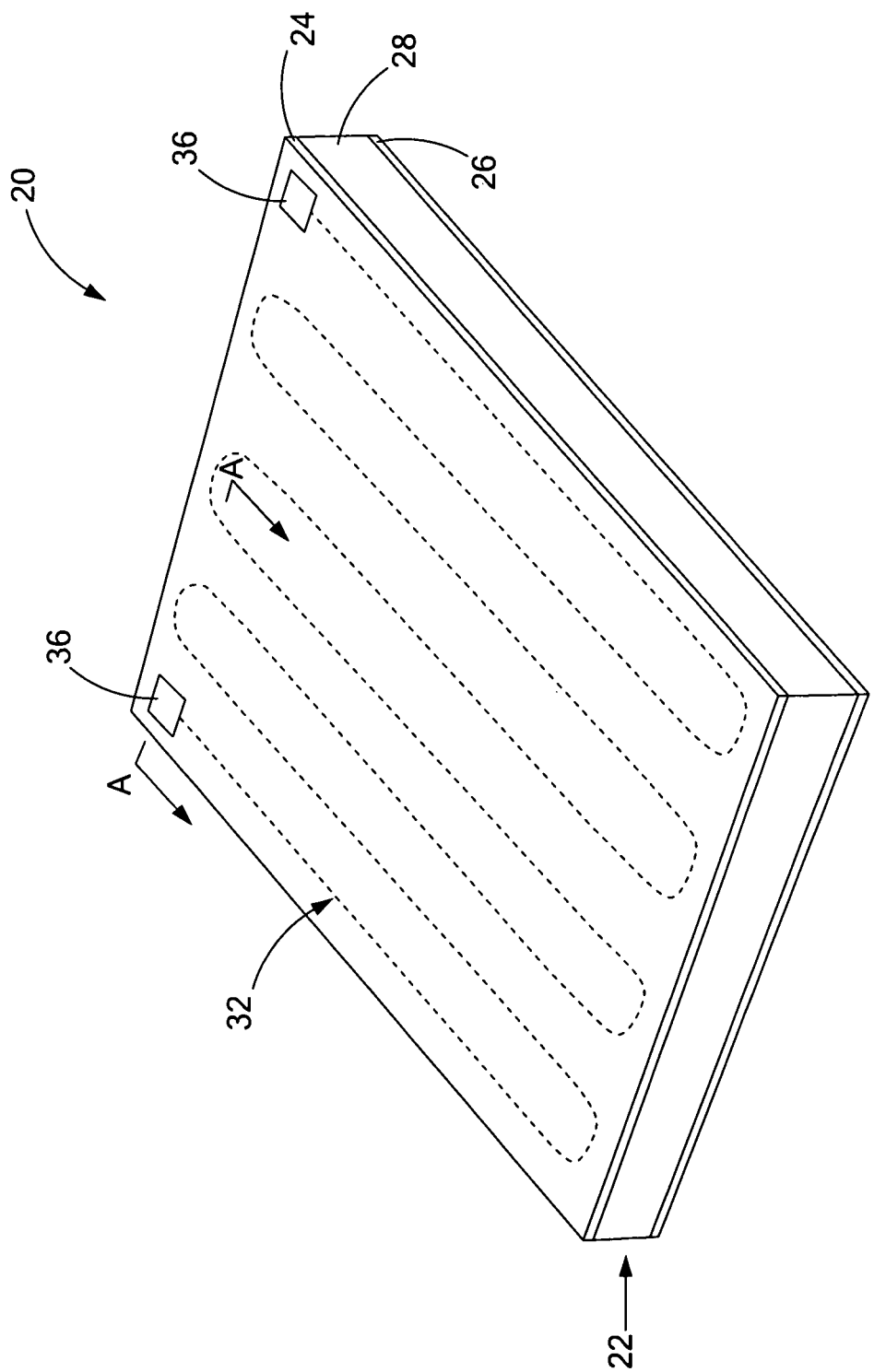
FIG. 1 is a perspective view of a layered heater system constructed in accordance with the principles of the present disclosure.
Figure 2:
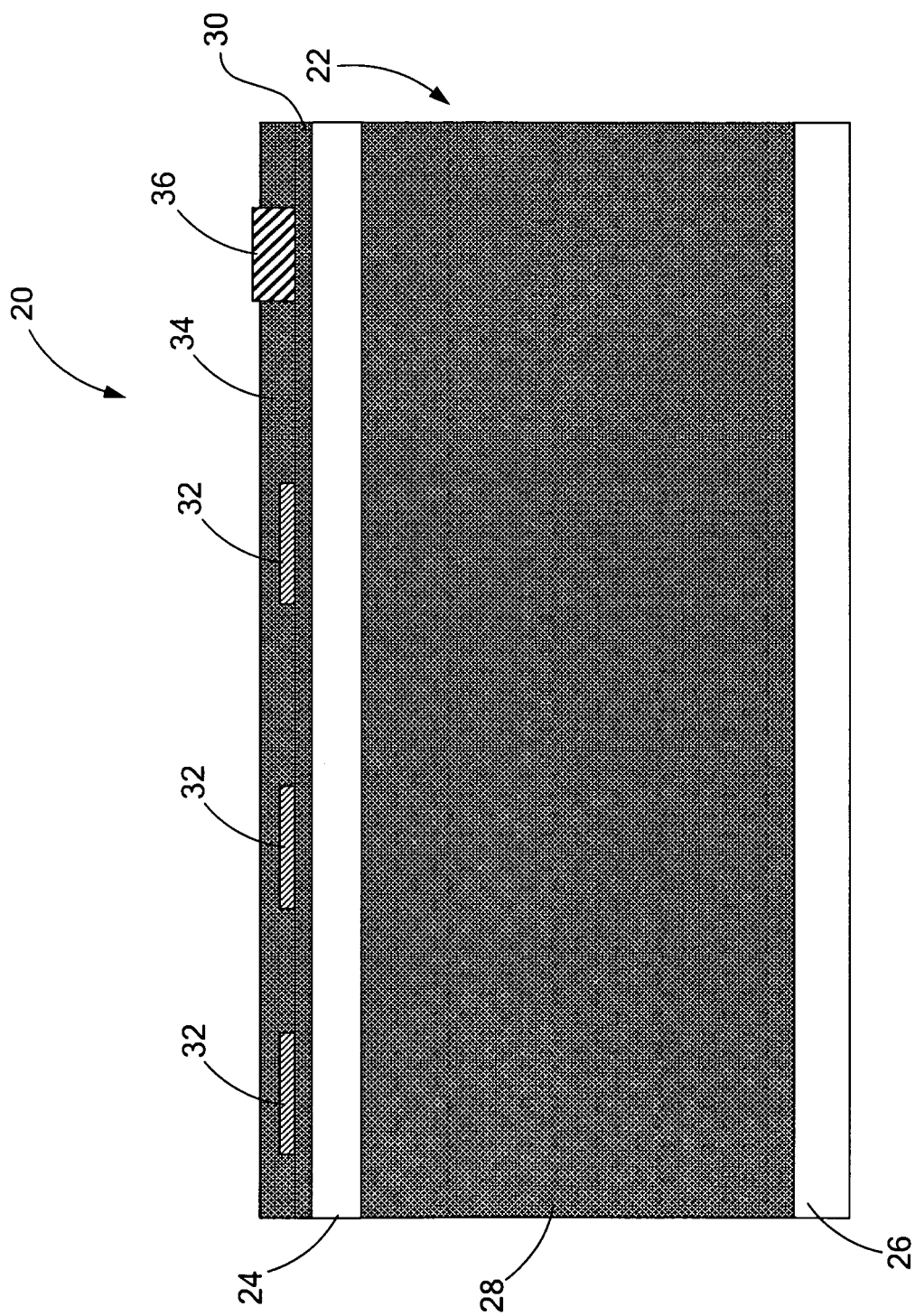
FIG. 2 is a partial cross-sectional view, taken along line A-A of FIG. 1, illustrating the layered heater system with an engineered substrate constructed in accordance with the principles of the present disclosure.

Referring to FIGS. 1-2, a layered heater system is illustrated and generally indicated by reference numeral 20. The layered heater system 20 comprises an engineered substrate 22 having an upper face sheet 24, a lower face sheet 26, and a core 28 disposed between the upper face sheet 24 and the lower face sheet 26. In one form, a dielectric layer 30 is formed on the upper face sheet 24 as shown, although it should be understood that a dielectric layer 30 could be formed on either or both of the upper face sheet 24 and the lower face sheet 26. A resistive element layer 32 (shown dashed in FIG. 1) is formed on the dielectric layer 30, and a protective layer 34 is formed on the resistive element layer 32. As further shown, terminal pads 36 (shown dashed in FIG. 1) are formed over at least a portion of the resistive element layer 32, wherein the terminal pads 36 are exposed to an outside environment, or to other components, through the protective layer 34. Each of the layers, in one form, are formed by a thick film layering process, although it should be understood that other thick film processes such as thin film, thermal spraying, or sol-gel, or a combination thereof, may be employed while remaining within the scope of the present disclosure. Such processes are set forth in greater detail in copending application Ser. No. 10/752,359, titled "Combined Material Layering Technologies," which is commonly assigned with the present application and the contents of which are incorporated herein by reference in their entirety.

If the engineered substrate 22 is a nonconductive material, the layered heater system 20 can be employed without the dielectric layer 30, wherein the resistive element layer 32 would be formed directly on, or proximate, the engineered substrate 22, with the protective layer 34 formed on the resistive element layer 32 as set forth above. Such a layered heater system without a dielectric layer 30 shall be construed as falling within the scope of the present disclosure.

Figure 3:
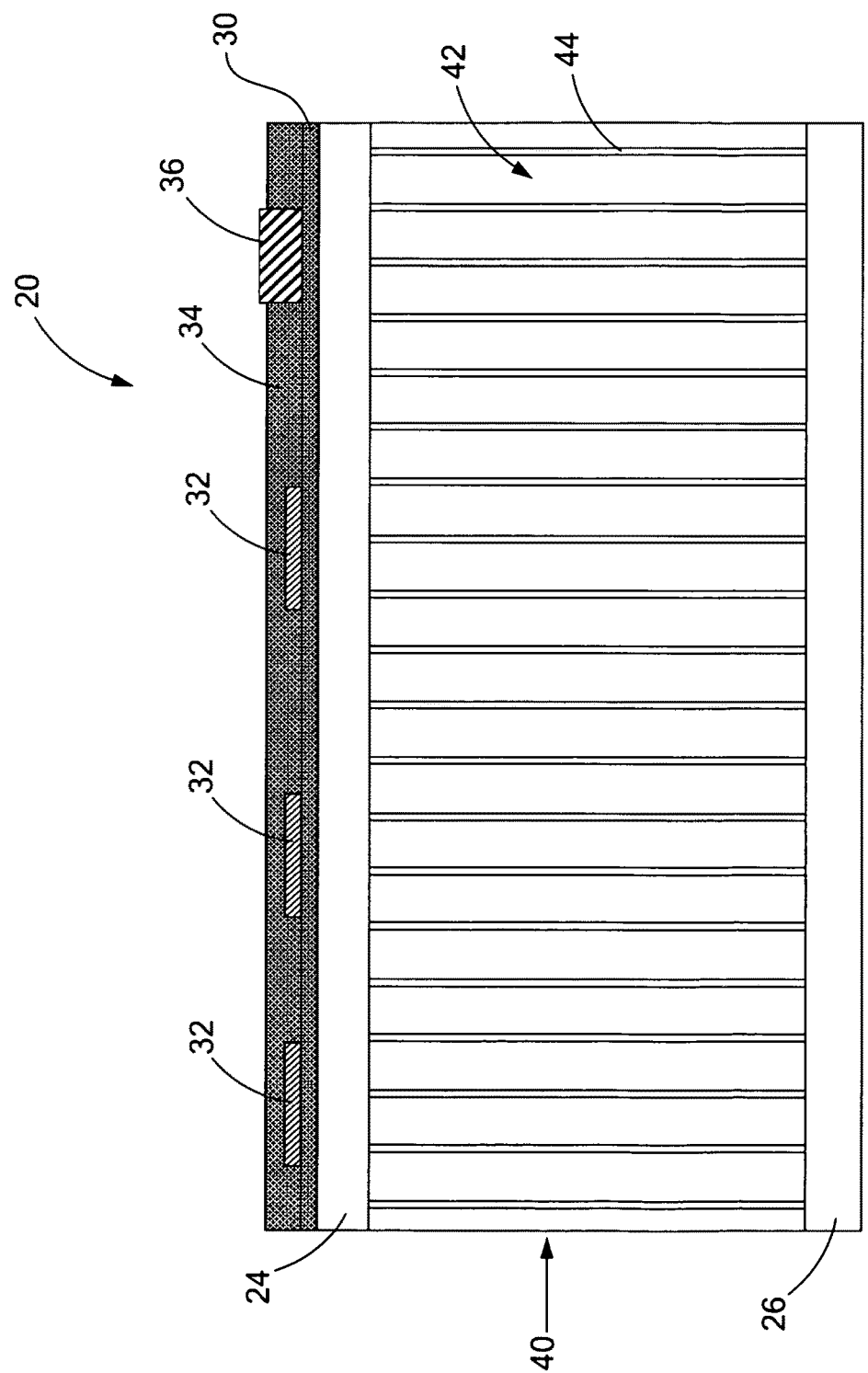
FIG. 3 is a cross-sectional view of one form of a layered heater system with an engineered substrate that defines a honeycomb core structure constructed in accordance with the principles of the present disclosure.
Figure 4:
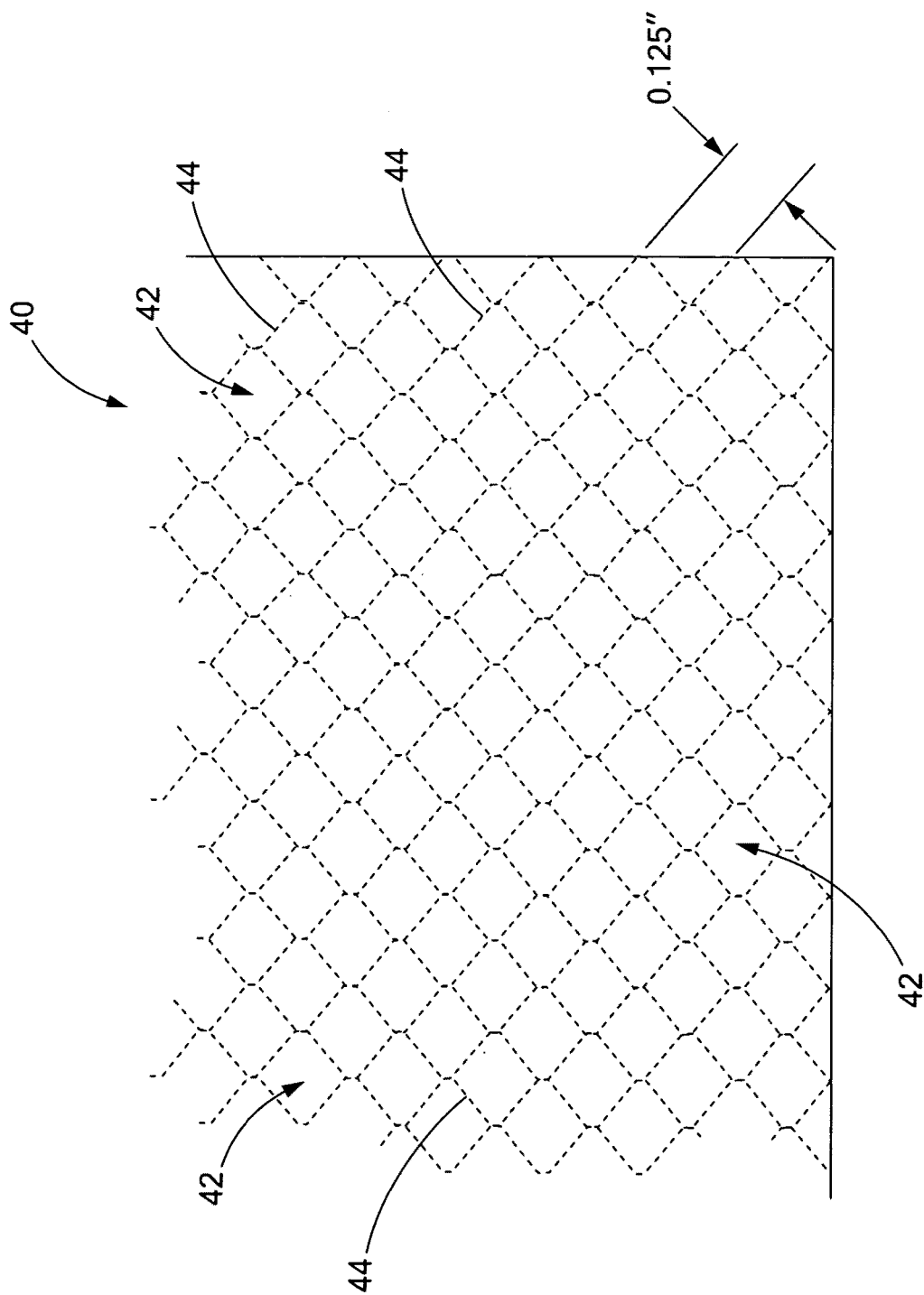
FIG. 4 is a partial top view of the layered heater system having a honeycomb core structure in accordance with the principles of the present disclosure.

Referring to FIGS. 3 and 4, in one form, the core 28 defines a honeycomb core structure 40. The honeycomb core structure 40 comprises a plurality of cells 42 that have walls 44 as shown. Each of the walls defines a thickness, which can be engineered for specific heat transfer requirements. For example, thicker walls 44 will result in increased heat transfer between the upper face sheet 24 and the lower face sheet 26, which may be required in certain applications. On the other hand, thinner walls 44 will result in increased thermal isolation between the upper face sheet 24 and the lower face sheet 26, which may be required in other applications. Moreover, and with specific reference to FIG. 4, the cells define a peripheral size, which is essentially the overall size of each cell, which is shown as 0.125 inches (0.049 cm) in one form of the present disclosure. It should be understood that this size is merely exemplary and that other sizes may be employed depending on the load requirements of the application. As such, the peripheral size can be tailored for specific load carrying capability.

In one form, the face sheets 24 and 26 are a stainless steel material such as 430 or 304, however, it should be understood that other materials may be employed while remaining within the scope of the present disclosure. For example, Nickel super alloys such Inconel® may be used, and/or Titanium for both the face sheets 24, 26, and the walls 44. Advantageously, stainless steel will resist creep at temperatures in excess of those that aluminum, for example. As such, the disclosure provides a light-weight structure that relatively stiff and that also resists creep. It should be understood that a variety of materials for the face sheets 24, 26 and the walls 44 may be employed while remaining within the scope of the present disclosure. For example, an austenitic stainless steel material for the walls 44 may be used with a ferritic material for the face sheets 24 and 26.

Referring now to FIG. 5, the layered heater system 20 in one form includes a temperature sensor 50. The temperature sensor 50 in this form is disposed within a thermowell 52, which extends through the core 28 as shown. A plurality of apertures 54 are formed through the individual walls 44 of the cells 42 in order to accommodate the thermowell 52, which in one form, is brazed to the core 28 as shown. It should also be understood that any number of thermowells 52 and temperature sensors 50 may be provided while remaining within the scope of the present disclosure.

With the honeycomb core structure 40, or the engineered substrate 22, the layered heater system 20 exhibits much higher stiffness-to-weight ratios that traditional flat panel designs. As such, the layered heater system 20 in accordance with the principles of the present disclosure resists deflection or sagging, and also resists thermal warpage to provide a superior heater solution.

Figure 6A:
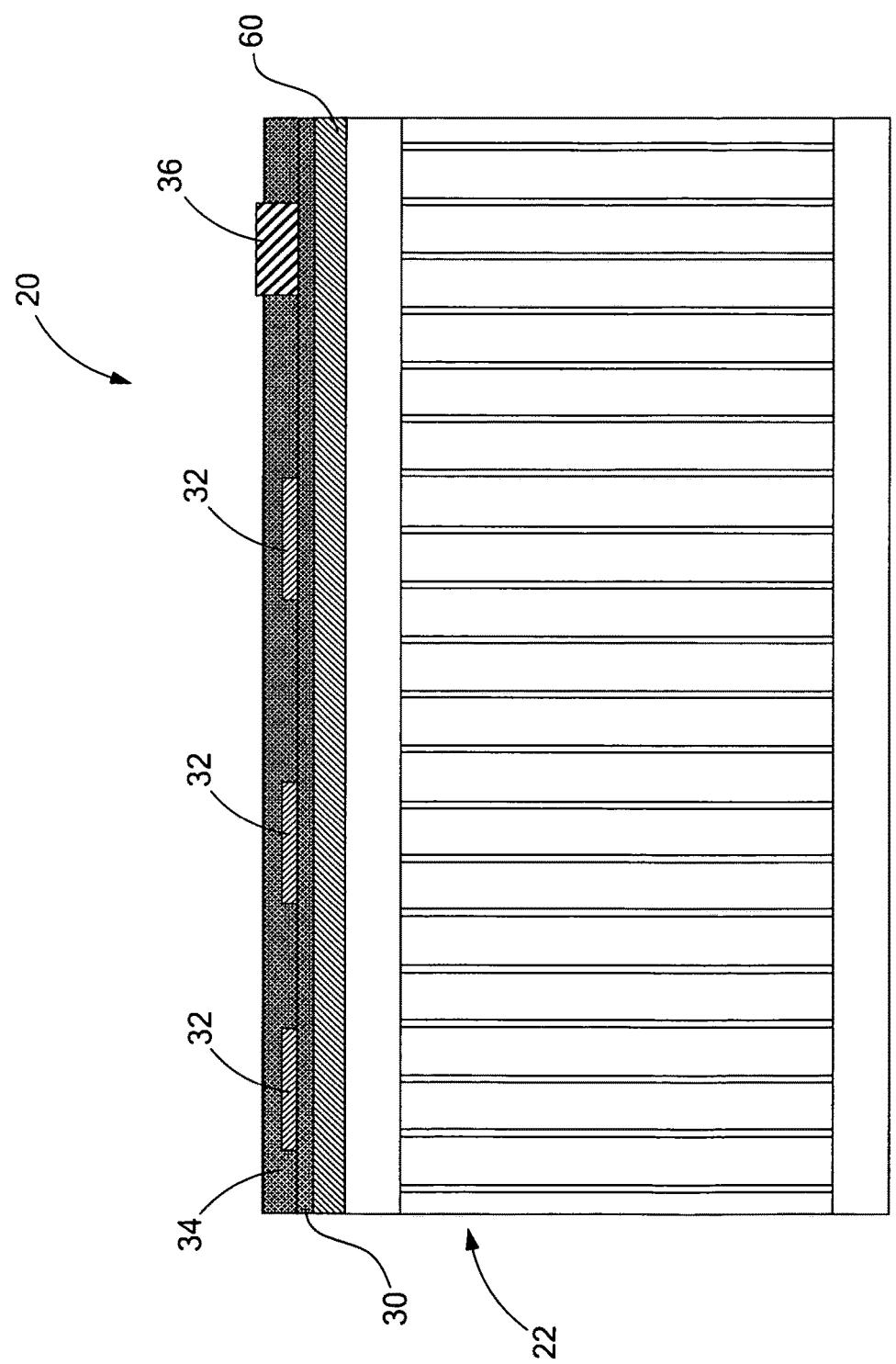
FIG. 6a is a cross-sectional view of another form of the layered heater system having a heater plate and constructed in accordance with the principles of the present disclosure.

Another form of the layered heater system 20 is illustrated in FIG. 6a, wherein a heater plate 60 is disposed proximate the engineered substrate 22, and then the layers as set forth above are disposed on the heater plate 60 rather than directly onto the engineered substrate 22. More specifically, the dielectric layer 30 is formed on the heater plate 60, the resistive element layer 32 formed on the dielectric layer 30, and the protective layer 34 is formed on the resistive element layer 32. As further shown, the terminal pads 36 are formed over at least a portion of the resistive element layer 32, wherein the terminal pads 36 are exposed to an outside environment, or to other components, through the protective layer 34. Similar to the previous form of the present disclosure, the heater plate 60 may be provided on either one or both of the face sheets 24 and 26 of the engineered substrate 22. Additionally, if the heater plate 60 is nonconductive, the dielectric layer 30 can be eliminated as set forth above, where the resistive element layer 32 is disposed directly onto the heater plate 60.

Figure 6B:
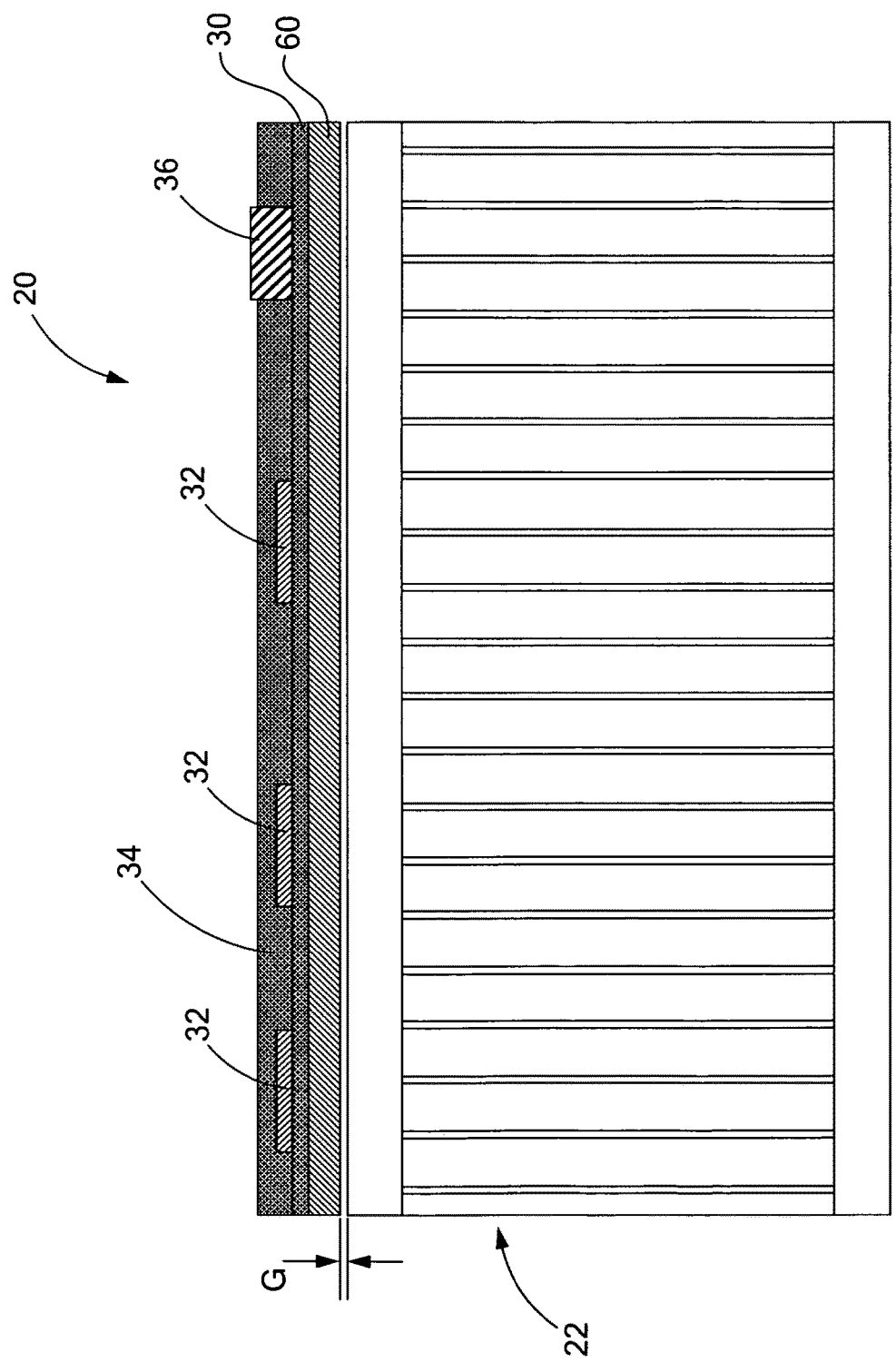
FIG. 6b is a cross-sectional view of yet another form of the layered heater system having a heater plate and constructed in accordance with the principles of the present disclosure.

As shown in FIG. 6b, the present disclosure in this form includes the ability to decouple and/or tailor the heat transfer to/from the heater plate 60 and the engineered substrate 22. In one form, such tailoring is accomplished by providing a gap/space "G" between the heater plate 60 and the engineered substrate 22. With this gap "G," the layered heater system 20 is thermally isolated from the engineered substrate 22. In another form, the heater plate 60 is in direct contact with the engineering substrate 22 as shown.

Figure 6C:
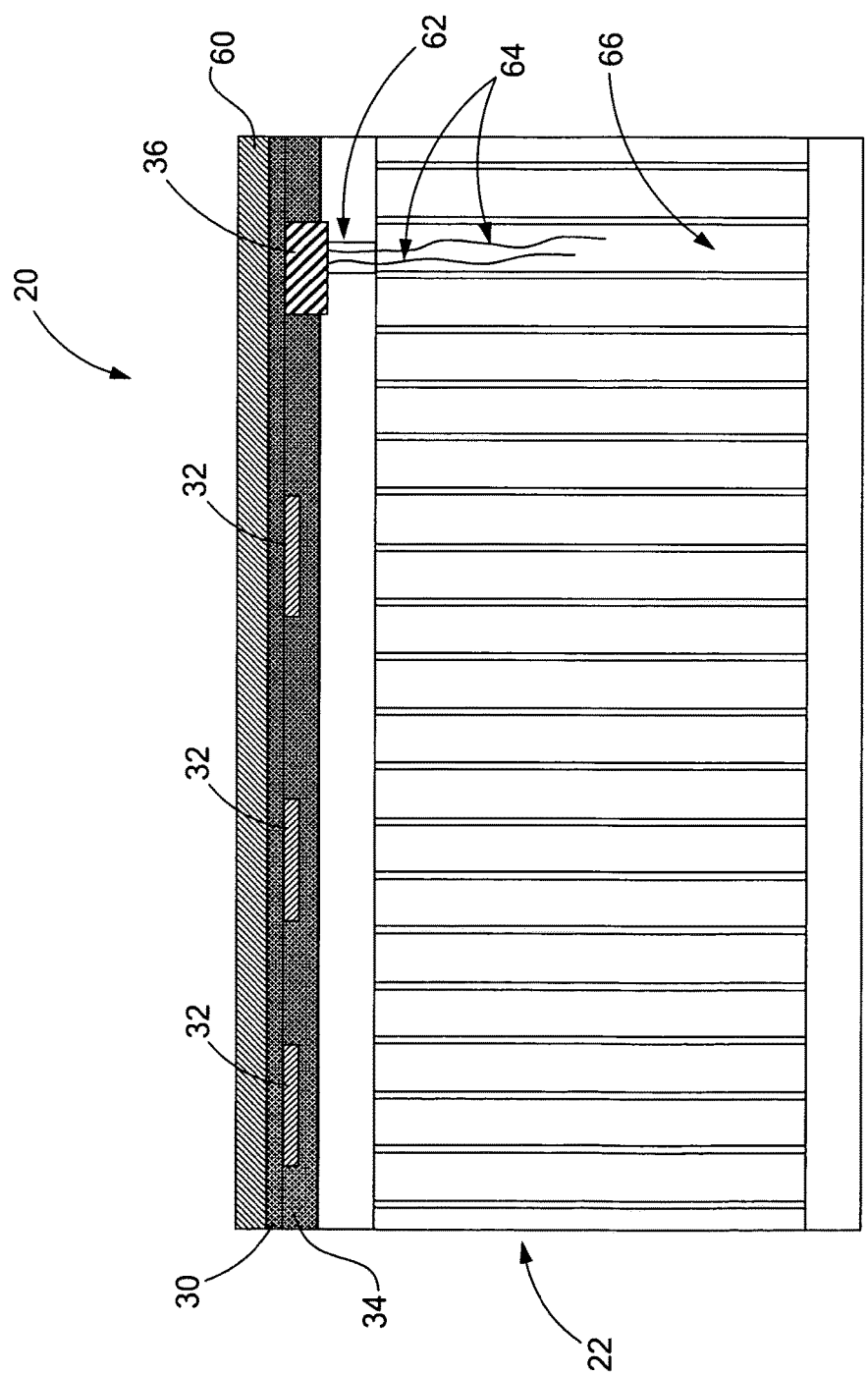
FIG. 6c is a cross-sectional view of still another form of the layered heater system having a heater plate and constructed in accordance with the principles of the present disclosure.

Referring to FIG. 6c, another form of the layered heater system 20 with the heater plate 60 is illustrated, wherein the resistive element layer 32 and terminal pads 36 are facing the support structure 22. In this form, an intra-structure termination is provided through an aperture 62 formed through the support structure 22, which allow for the passage of lead wires 64 and the housing of various components (such as the electrical interconnects as set forth below, and/or a power controller, by way of example) inside a cavity 66 of the support structure 22. As a result, a more compact design is provided since the termination, wiring, and components are packaged within the support structure 22.

Figure 7:
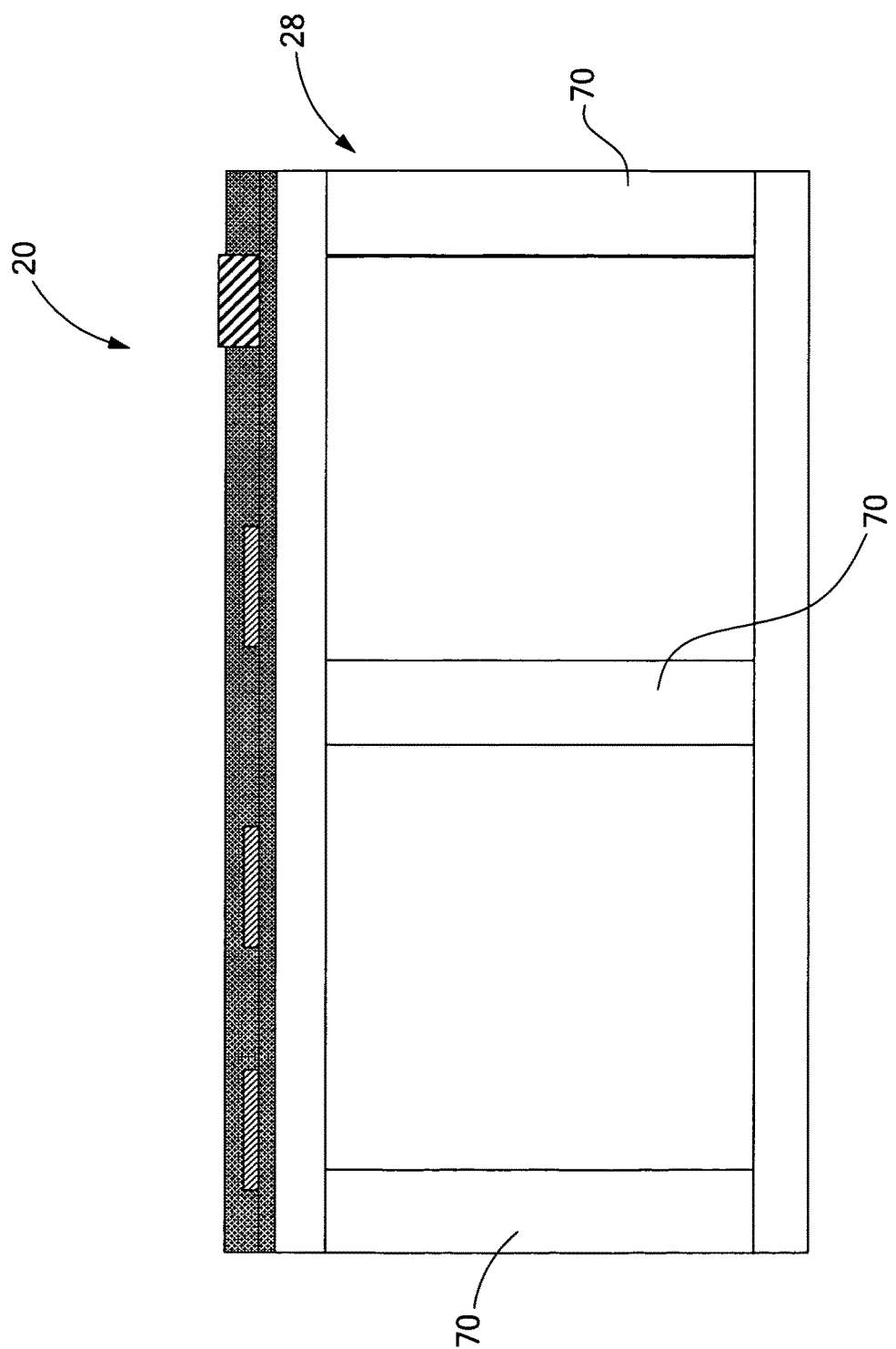
FIG. 7 is a cross-sectional view of another form of the layered heater system having a core defining a frame structure constructed in accordance with the principles of the present disclosure.

Referring now to FIG. 7, another form of the layered heater system 20 includes a core 28 defining a frame structure having a plurality of support ribs 70. The position, shape (i.e. cross-sectional bending section), height, length, and thickness of the individual support ribs 70 can thus been engineered or tailored similar to the honeycomb cells 42 as set forth above, in order to provide specific heat transfer requirements and/or stiffness, depending on the requirements of the end application.

Figure 8:
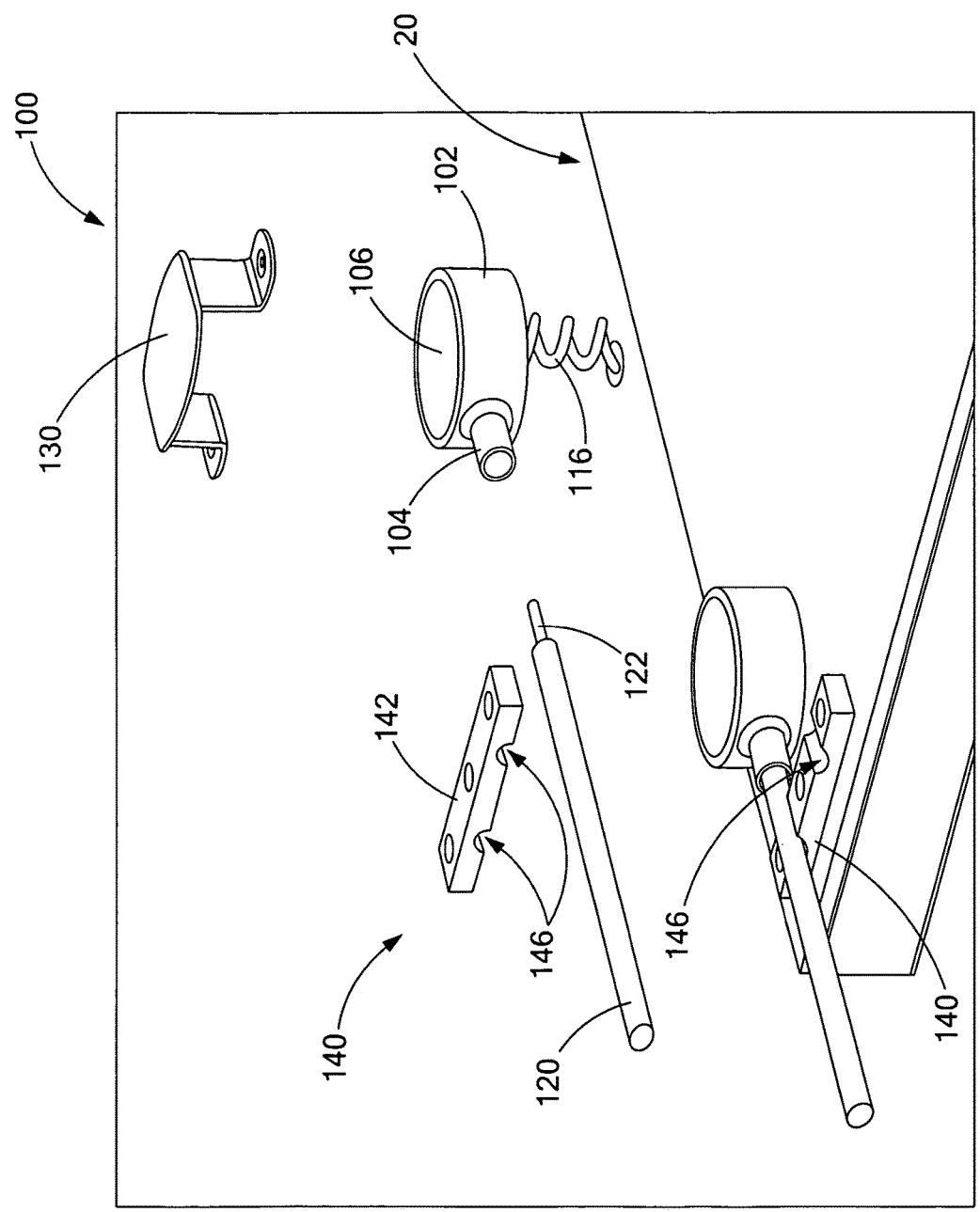
FIG. 8 is an exploded view of an electrical interconnect assembly for use in connecting terminal pads of a resistive heater to a power supply in a vacuum environment and constructed in accordance with the principles of the present disclosure.
Figure 9:
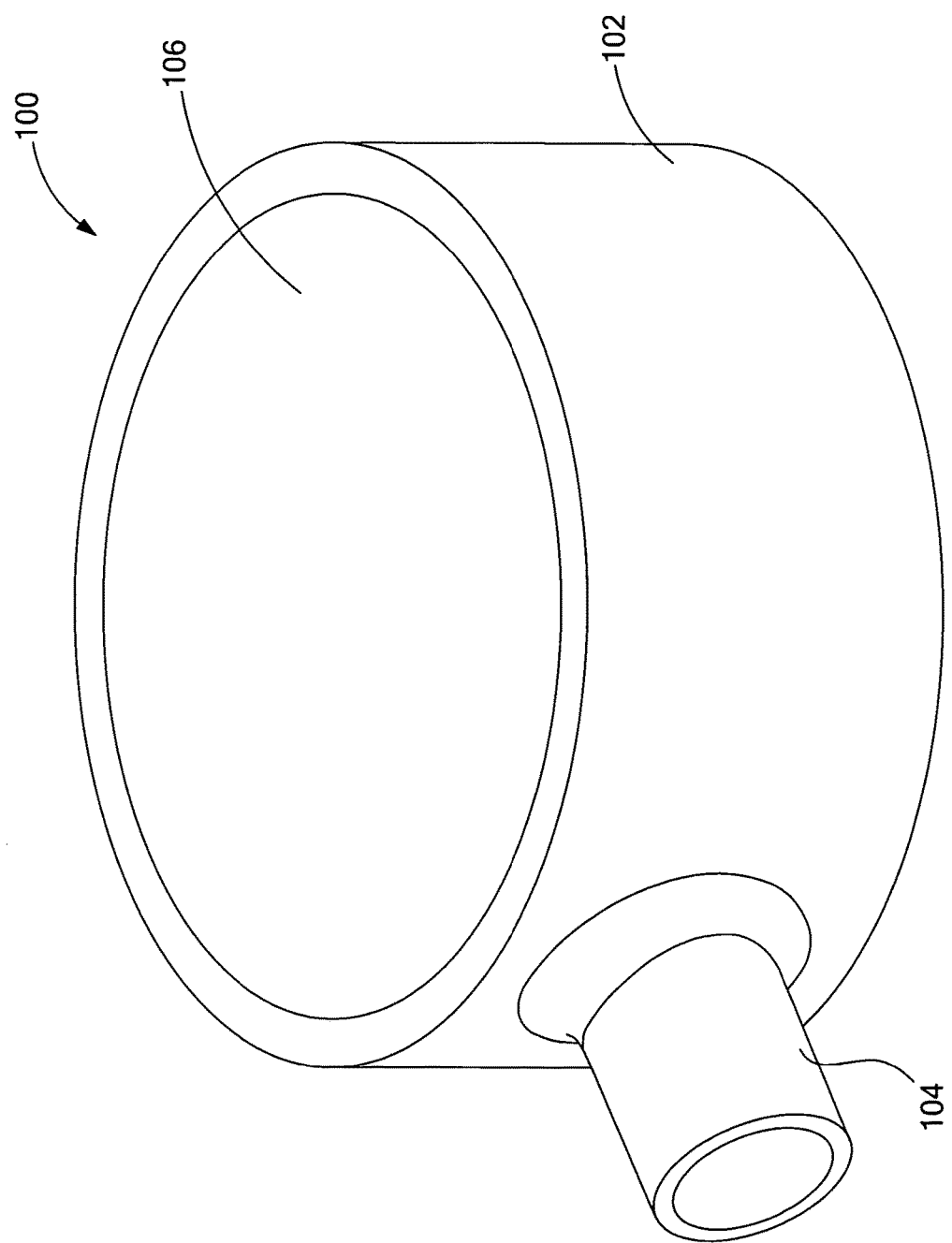
FIG. 9 is a perspective view of an electrical interconnect in accordance with the principles of the present disclosure.
Figure 10:
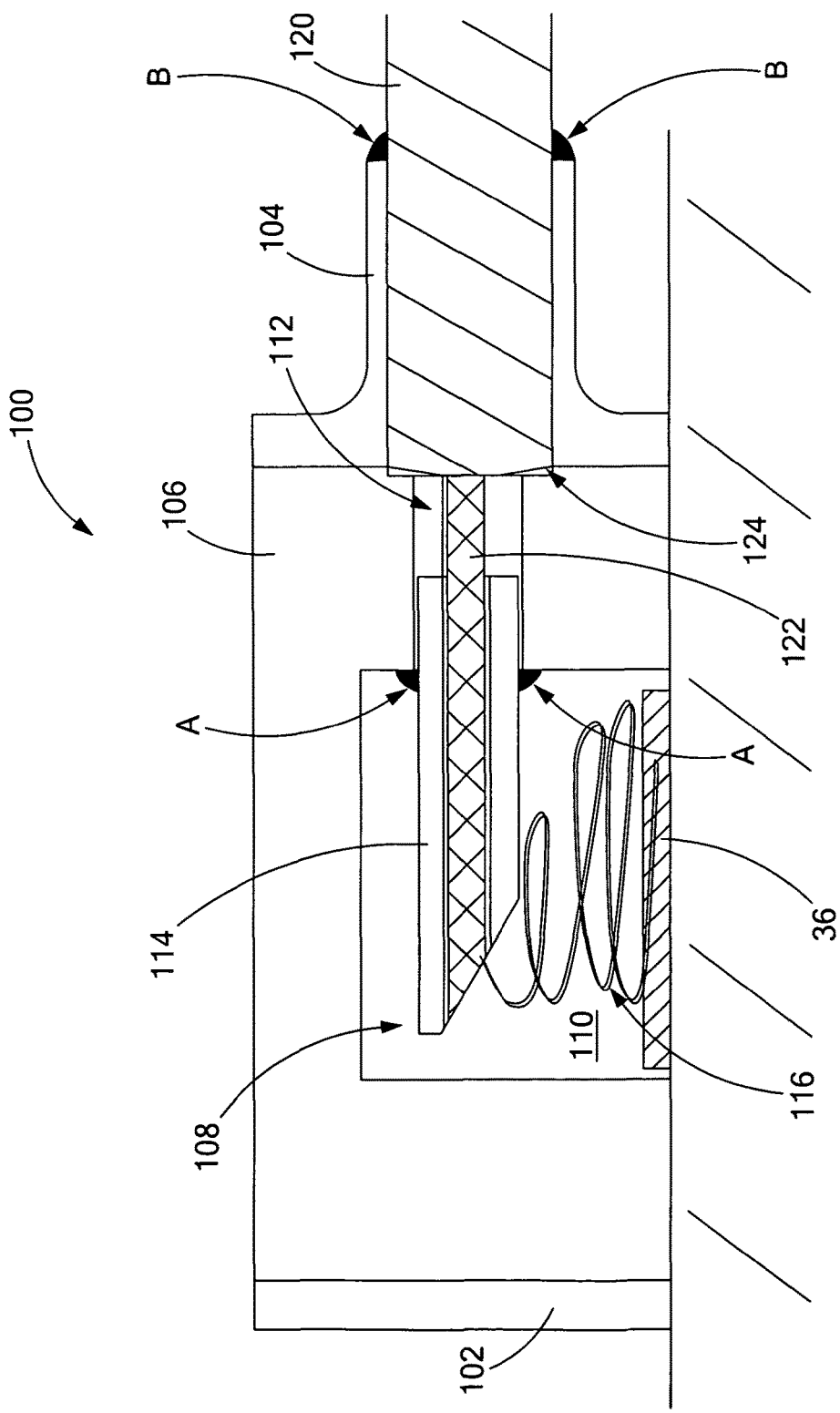
FIG. 10 is a cross-sectional view of the electrical interconnect in accordance with the principles of the present disclosure.

Referring now to FIGS. 8-10, an electrical interconnect for use in connecting terminal pads 36 of the layered heater system 20 to a power supply (not shown) is illustrated and generally indicated by reference numeral 100. As shown, the electrical interconnect 100 comprises a housing 102, which defines an extension 104. A dielectric enclosure 106 is disposed within the housing 102 and is electrically sealed thereto (which is described in greater detail below). The dielectric enclosure 106 defines an inner cavity 108 having a central portion 110 and a lateral portion 112. The lateral portion 112 is disposed proximate the extension 104 of the housing 102. An insert 114 is disposed within the inner cavity 108 proximate the lateral portion 112 as shown. In one form, as shown in FIG. 10, the insert 114 extends partially into the lateral portion 112. A contact member 116 is adapted for electrical contact with the insert 114, which in one form is a coiled wire (or spring) as shown in FIG. 10. In alternate forms, the contact member 116 may be a wave spring, a disk spring, a coil spring or a metal bellows. Furthermore, it should be understood that the contact member 116 can be used to force the insert 114 against the terminal pad 36 or it can be used between the insert 114 and the terminal pad 36. The contact member 116 is then adapted for electrical contact with at least one terminal pad 36 of the layered heater system 20. A lead wire having a conductor 122 then extends through the lead extension 104 and abuts the dielectric enclosure 106, preferably at a spot-face 124 as shown in FIG. 10. The conductor 122 is then adapted for electrical contact with the insert 114 and/or the contact member 116 to provide electrical continuity from the power supply to the terminal pad 36.

Because one application of the electrical interconnect 100 is in a vacuum environment at relatively high voltages, and also in vacuum environments in which plasma is introduced, the electrical interconnect 100 should be electrically sealed, i.e. not allow any discharge of electricity to the outside environment, along with being vacuum sealed. As used herein the term "electrically sealed" should be construed to mean a close conformal fit that prevents arcing, flow or discharge of electricity during operation in a vacuum with relatively high voltages applied, for example, 1000 VAC, while allowing air to escape through pores, or small openings or gaps so as not to create a "virtual leak" that would cause difficulty in creating and maintaining a vacuum. Various locations within the electrical interconnect should also be vacuum sealed, in addition to being electrically sealed, which are illustrated and described herein. Accordingly, in one form, the insert 114 is brazed to the dielectric enclosure 106 at location A. Furthermore, the lead wire 120 is brazed to the lead extension 104 at location B. Additional brazing may be provided in a variety of locations in order to properly seal the electrical interconnect 100 from an accidental discharge of electricity.

As further shown in FIG. 8, the electrical interconnect 100 also comprises a cover 130 that is used to secure the electrical interconnect 100 to the layered heater system 20 (preferably with mechanical fasteners, which are not shown for purposes of clarity). Additionally, a strain relief 140 may be provided as shown, which includes in one form a lower support 142 and an upper support 144, both defining grooves 146 in which the lead wires 120 are disposed.

Figure 11:
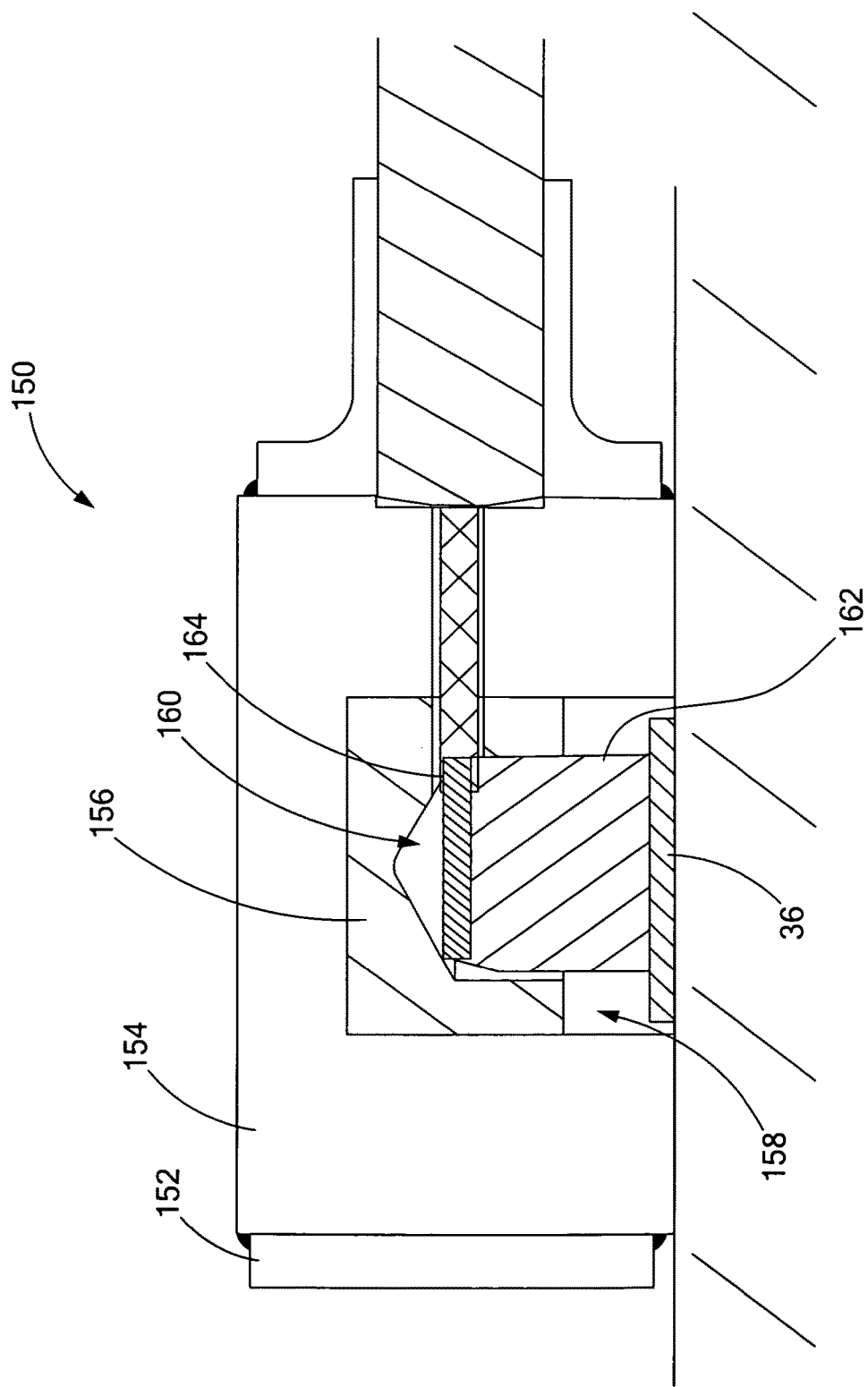
FIG. 11 is a cross-sectional view of another form of an electrical interconnect constructed in accordance with the principles of the present disclosure.

Referring now to FIG. 11, another form of an electrical interconnect is illustrated and generally indicated by reference numeral 150. This electrical interconnect includes a housing 152 and a dielectric enclosure 154, along with other common elements set forth above (which are not illustrated for purposes of clarity). An alternate form of an insert 156 is disposed within an inner cavity 158 of the dielectric enclosure 154, which is similarly brazed to the dielectric enclosure 154 to provide a leak-tight interface. The insert 156 includes an internal bore 160, in which the contact member is a conductive slug 162 as shown. Further, a wave spring 164 is provided within the internal bore 158, which forces the conductive slug 160 into a firm electrical contact with the terminal pad 36. It should be understood that the relative positions of the conductive slug 162 and the wave spring 164 may be altered, and it should further be understood that the spring contact member 116 of the previous embodiment may be employed with this electrical interconnect 150, and the conductive slug contact member 162 and wave spring 164 of this embodiment may be employed with the previous embodiment while remaining within the scope of the present disclosure. Such variations and interchangeable components should be construed as being within the teachings of the present disclosure.

Figure 12:
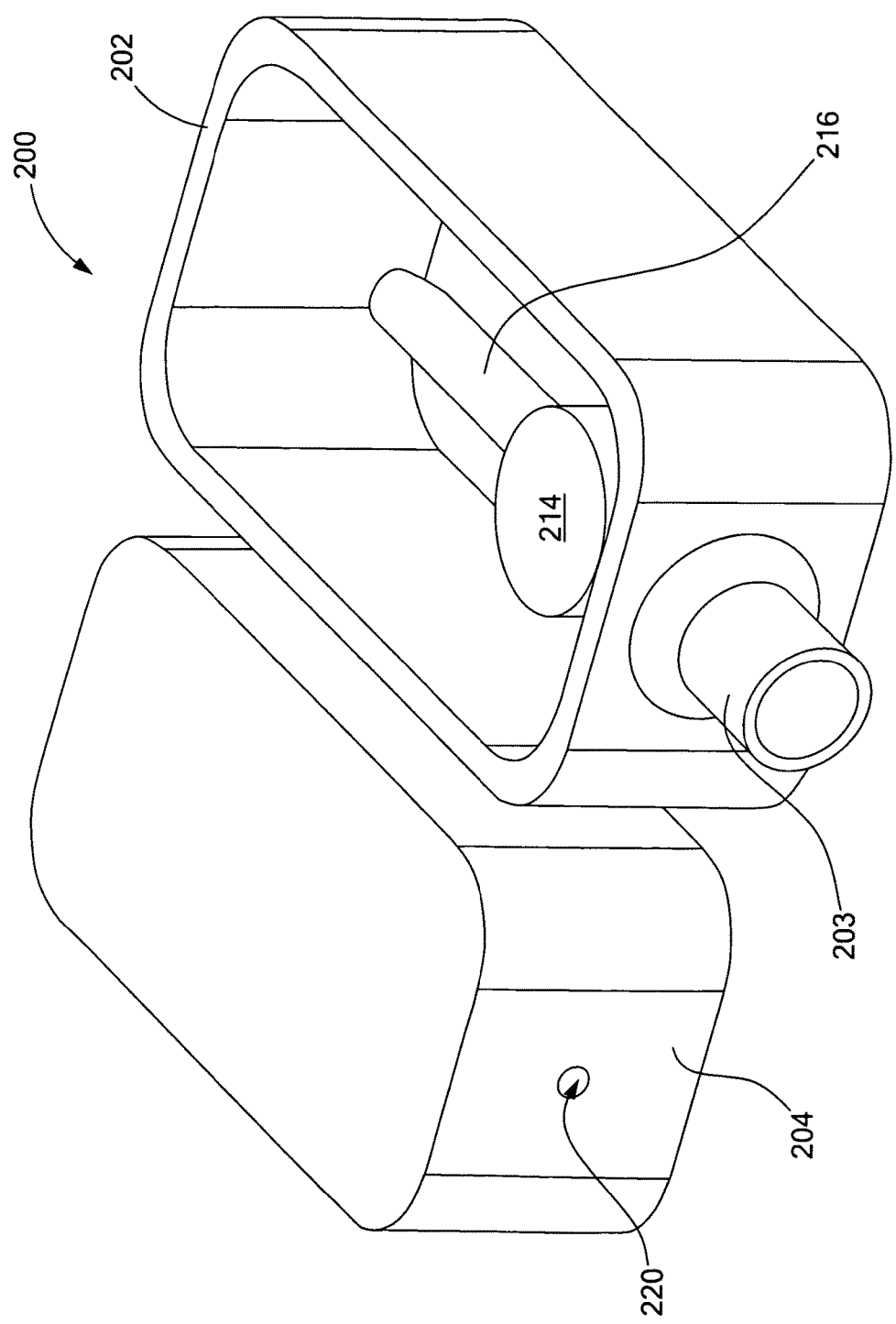
FIG. 12 is an exploded top view of yet another form of an electrical interconnect constructed in accordance with the principles of the present disclosure.
Figure 13:
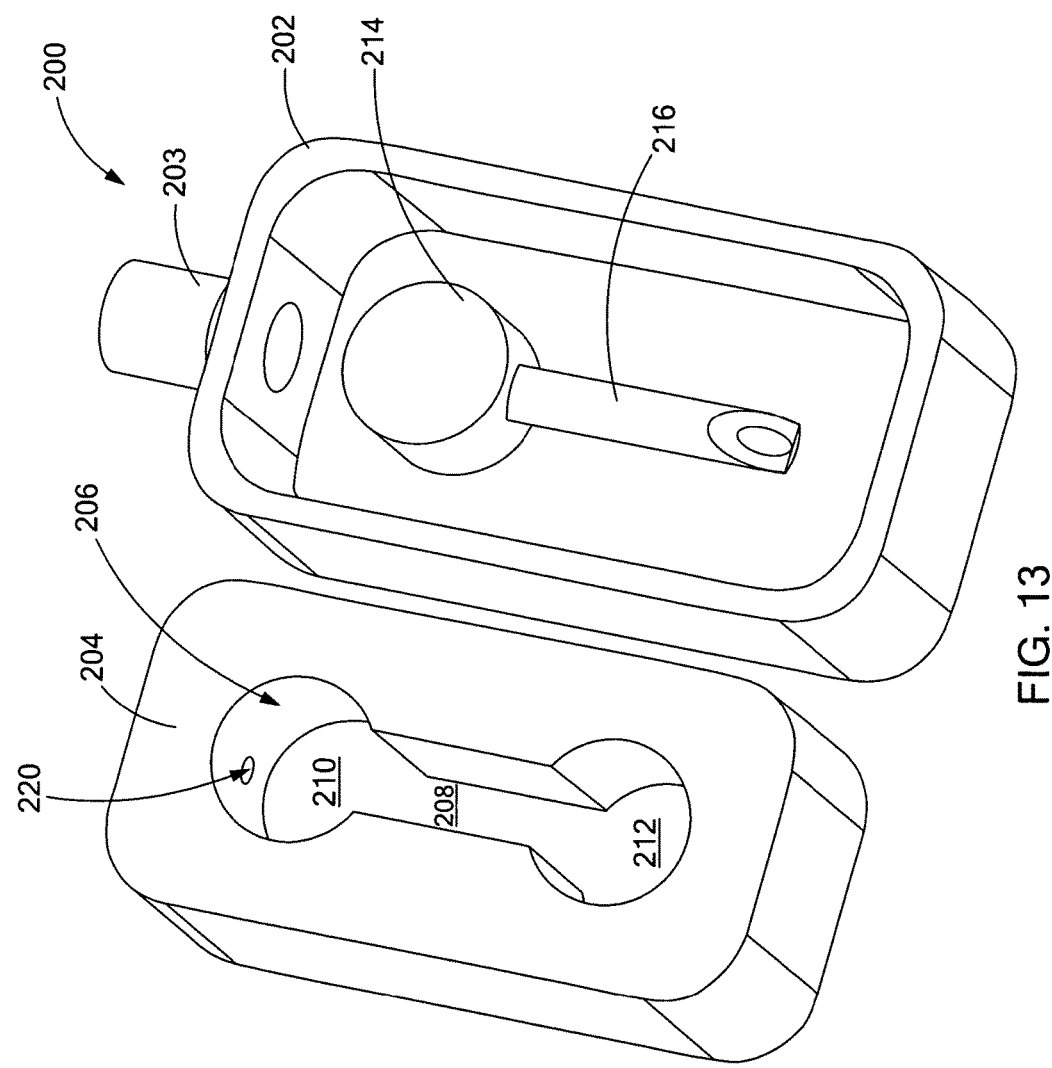
FIG. 13 is an exploded bottom view of the electrical interconnect of FIG. 12 in accordance with the principles of the present disclosure.
Figure 14:
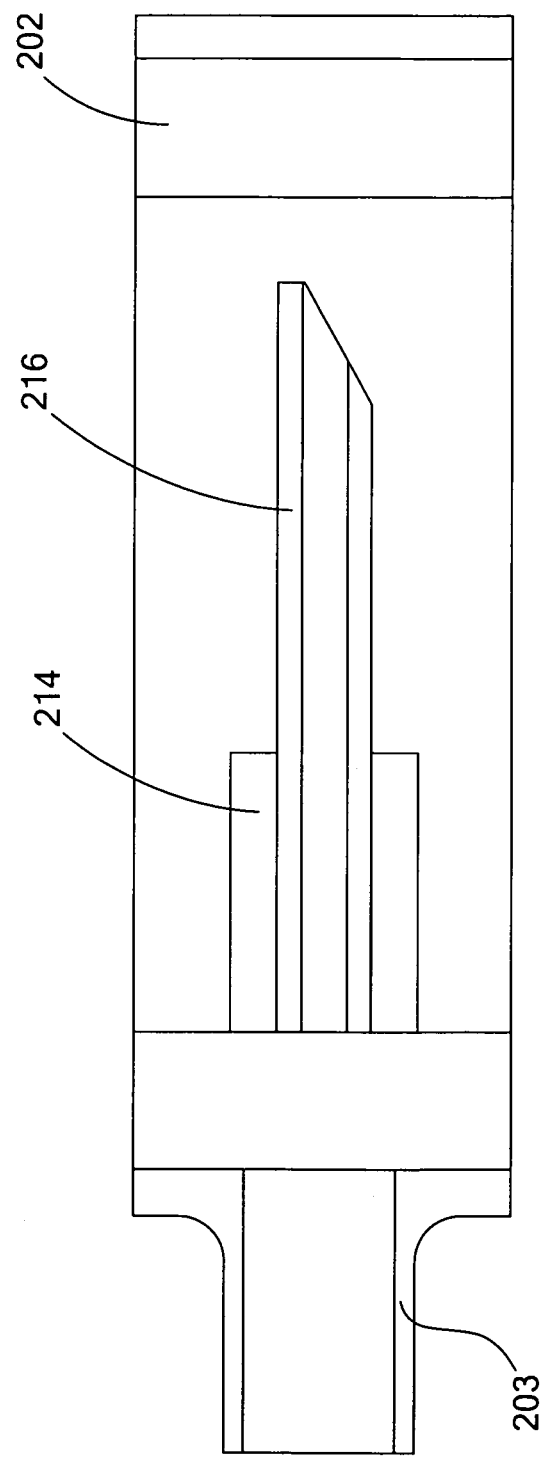
FIG. 14 is a cross-sectional view taken through a housing of the electrical interconnect of FIGS. 12 and 13 in accordance with the principles of the present disclosure.

FIGS. 12-14 illustrate another form of an electrical interconnect 200, in which the brazing of internal components is moved a distance away from the electrical connection at a terminal pad 36 and also provides a heat sink to keep heat away from the electrical connection area. As shown, the electrical interconnect includes a housing 202 with an extension 203. (It should be understood that all of the lead extensions as set forth herein need not be integral and thus can be a separate component while remaining within the scope of the present disclosure). A dielectric enclosure 204 is also provided that defines an inner cavity 206 having a central portion 208 extending between opposed end portions 210 and 212. The end portion 210 is disposed proximate the lead extension 203, and a plug 214, or heat sink, is disposed within the end portion 210. An insert 216, similar to those previously illustrated and described extends into the plug 214 and through the central portion 208 of the inner cavity 206 of the dielectric enclosure 204. A contact member (not shown—and taking the form of any of the contact members as previously set forth) is then disposed within the end portion 212 and is in electrical contact with the insert 216 and the terminal pad 36 (not shown).

As further shown, the dielectric enclosure 204 includes a passageway 220, which accommodates the conductor 122 as previously set forth. Additionally, the other components as set forth above, such as the cover 130 and the strain relief 140, by way of example, may also be employed with this embodiment while remaining within the scope of the present disclosure.

Figure 15:
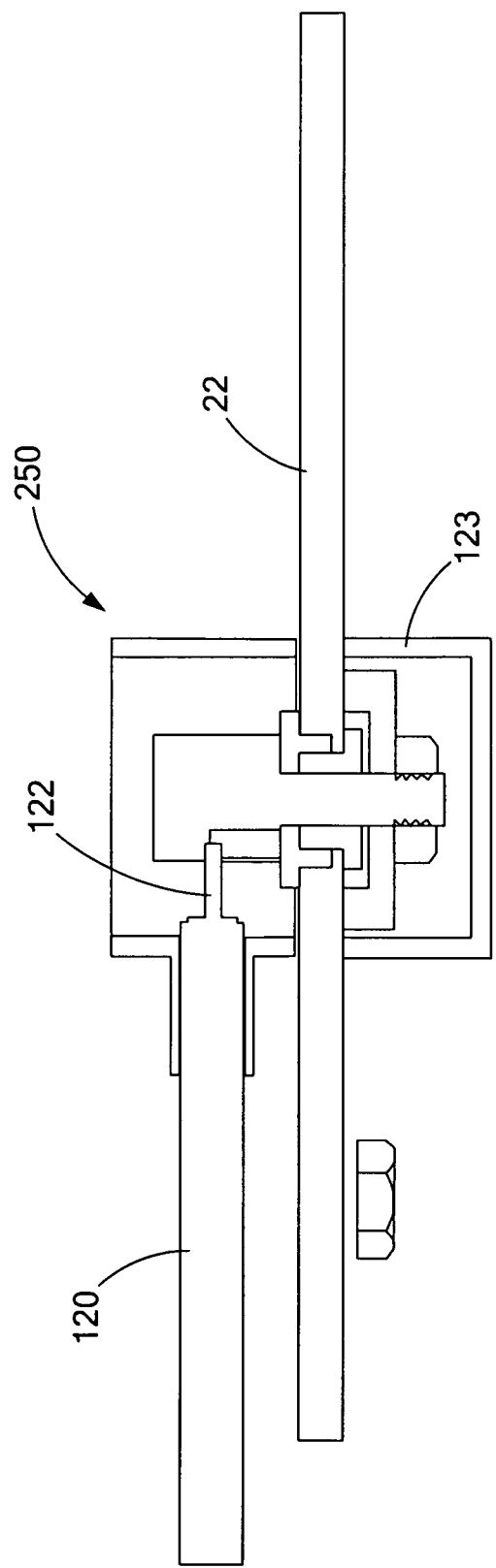
FIG. 15 is a cross-sectional view taken through another form of an electrical interconnect wherein the electrical interconnect is on one side of a substrate and the layered heater is on the other side of the substrate and constructed in accordance with the principles of the present disclosure.

Referring now to FIG. 15, another form of an electrical interconnect is illustrated and generally indicated by reference numeral 250. The electrical interconnect 250 is configured to connect the lead wire 120 and conductor 122 on one side of the substrate 22, while the layered heater system 20 is disposed on the other side of the substrate 22. The use of a dielectric cover 123 is provided in order to provide a high voltage electrical interconnect.

Figure 16:
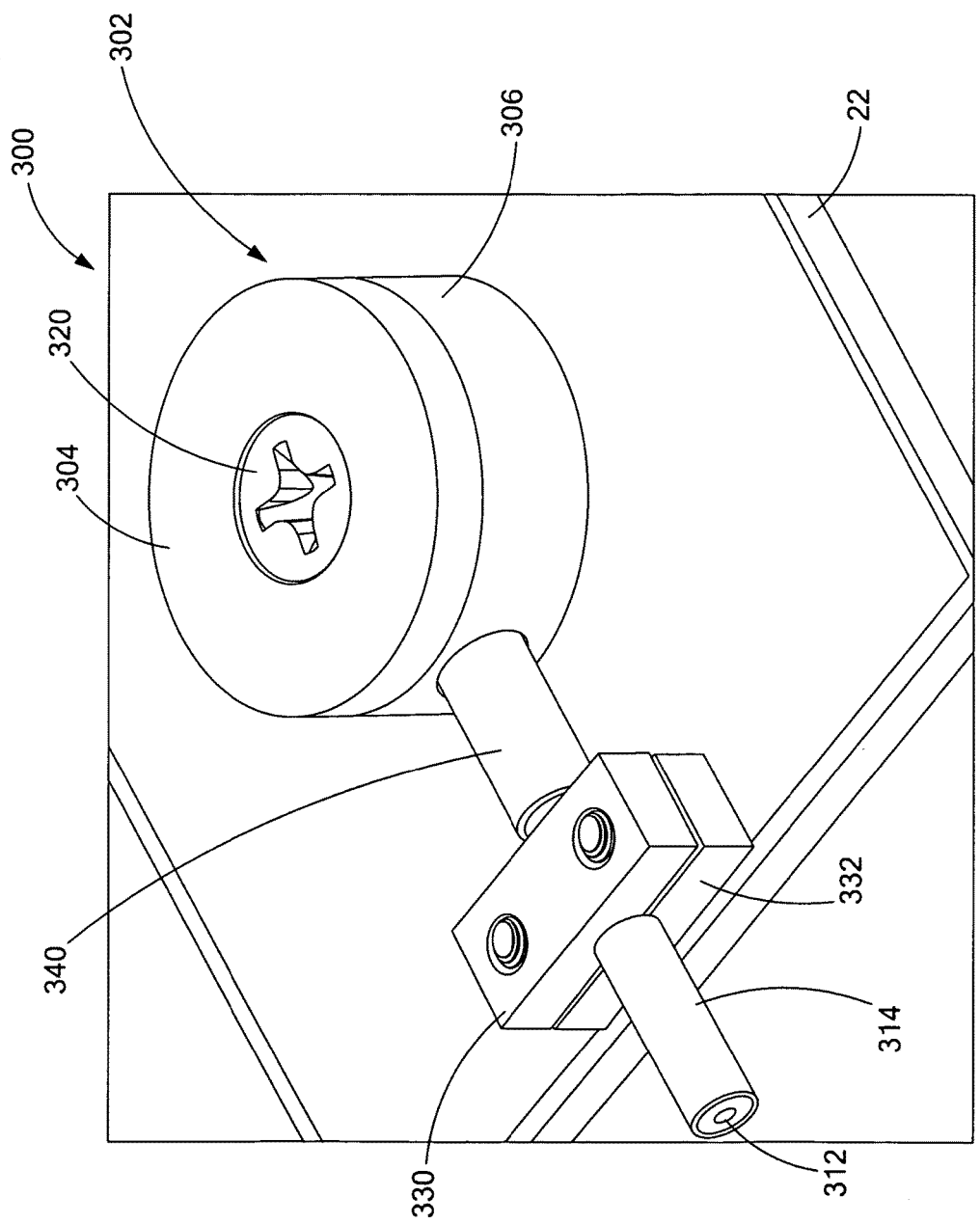
FIG. 16 is a perspective view of another form of an electrical interconnect constructed in accordance with the principles of the present disclosure.
Figure 17:
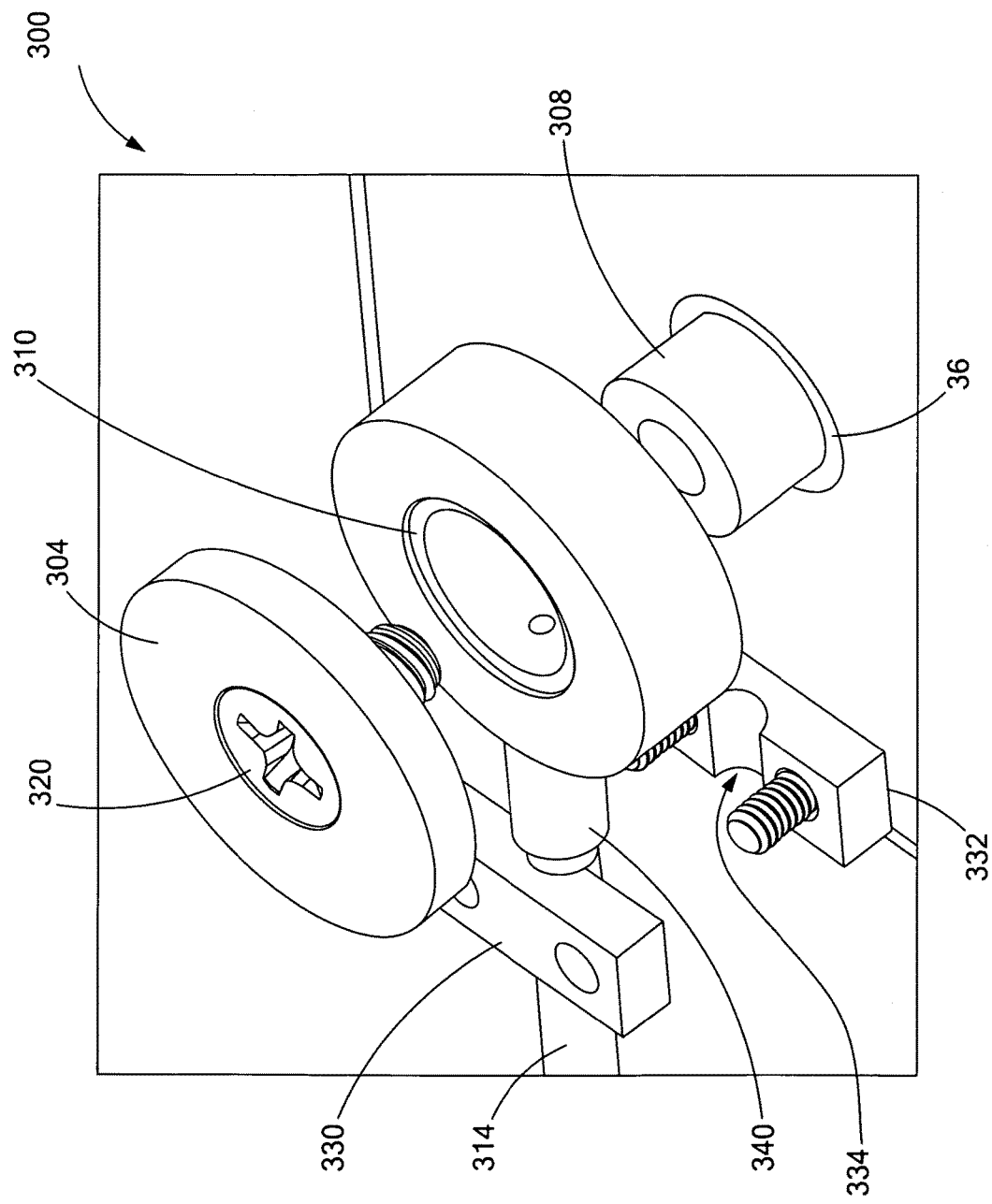
FIG. 17 is an exploded view of the electrical interconnect in accordance with the principles of the present disclosure.
Figure 18:
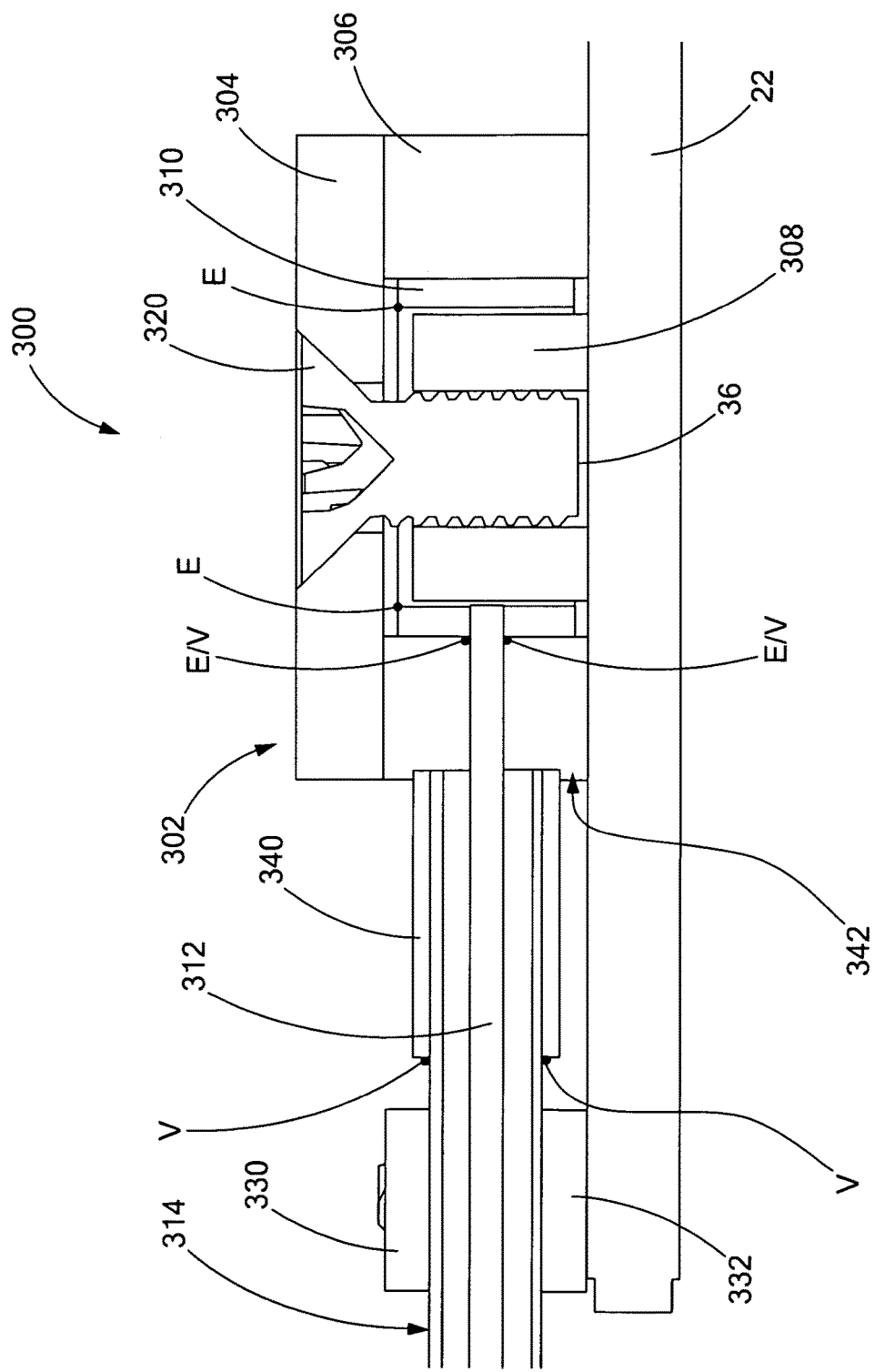
FIG. 18 is a cross-sectional view of the electrical interconnect in accordance with the principles of the present disclosure.

Another form of an electrical interconnect is illustrated in FIGS. 16-18 and is generally indicated by reference numeral 300. As shown, the electrical interconnect 300 comprises a dielectric enclosure 302 having an upper cap 304 and a lower base 306. A conductive slug 308 is disposed within the lower base 306 as shown and in one form is bonded to the terminal pad 36. The conductive slug 308 is surrounded by an inner rim 310, which is in electrical contact with conductor 312 of the lead wire assembly 314. In one form, the conductor 312 is brazed or welded to the inner rim 310 as shown. This location is both an electrical seal and a vacuum seal, as designated by the "E/V" symbol. The locations that include brazing or welding for an electrical seal are designated with the "E" symbol, and the locations that include brazing or welding for a vacuum seal are designated with a "V" symbol. It should be understood that a variety of interfaces can be provided that should be sealed electrically, vacuum, or both in order to provide for proper operation of the electrical interconnect.

As an alternative to brazing or welding, an electrical matte (e.g., a silver braid) may be disposed between the various elements that require electrical sealing, such as the interface between the conductive slug 308 and the inner rim 310. It should be understood that this alternate form of sealing is merely exemplary, and that other approaches to sealing (both electrically and vacuum) the various interfaces of the electrical interconnects disclosed herein are to be construed as falling within the scope of the present disclosure.

As further shown, a fastening member 320 is shown through the upper cap 304, which in one form is threaded to the conductive slug 308 to secure the upper cap 304 in place, to secure the conductive slug 308 more firmly against the terminal pad 36, and to provide for additional electrical sealing of the overall electrical interconnect assembly 300. The fastening member 320 is nonconductive, and in one form is a ceramic material. It should be understood that although a threaded member is illustrated, other types of fastening members and materials (for example, quick disconnects, magnetic, adhesives, among others) may be employed while remaining within the scope of the present disclosure.

The electrical interconnect 300 also includes provisions for strain relief of the lead wire assembly 314. First, the lead wire assembly 314 is secured to the substrate 22 using blocks 330 and 332, which are fastened to the substrate 22 as shown. The blocks 330 and 332 include cutouts 334 (FIG. 17) for the lead wire assembly 314, which are sized slightly smaller than the outer diameter of the lead wire assembly 314 in order to provide an adequate amount force to reduce lateral movement of the lead wire assembly 314. Additionally, a strain relief element 340, in the form of a metal tube in this particular embodiment of the present disclosure, is disposed within a recess 342 of the lower base 306 and surrounds the lead wire assembly 314 as shown. In this configuration, if the lead wire assembly 314 is deflected or moved, loads will be introduced and dissipated through the strain relief element 340 and into the lower base 306.

Additional forms for the electrical interconnects are illustrated and described in copending application Ser. No. 11/591,203 titled "High Voltage Heater Termination," which is commonly assigned with the present application and the contents of which are incorporated herein by reference in their entirety.

The description of the invention is merely exemplary in nature and, thus, variations that do not depart from the substance of the disclosure are intended to be within the scope of the invention. Such variations are not to be regarded as a departure from the spirit and scope of the invention. Additional descriptions and illustrations of the various embodiments are further set forth in Appendix A hereto, which is hereby incorporated by reference in its entirety.

What is claimed is:

1. A layered heater system comprising:
   an engineered substrate comprising an upper face sheet, a lower face sheet, and a core disposed between the upper face sheet and the lower face sheet;
   a resistive element layer formed proximate at least one of the upper face sheet and the lower face sheet;
   a protective layer formed on the resistive element layer; and
   terminal pads formed over at least a portion of the resistive element layer, wherein the terminal pads are exposed through the protective layer,
   wherein the engineered substrate includes a plurality of walls to control a predetermined amount of heat transfer from one of the upper face sheet and the lower face sheet through the plurality of walls to the other one of the upper face sheet and the lower face sheet based on size of the plurality of walls and to control portions of the other one of the upper face sheet and the lower face sheet being heated based on positions of the plurality of walls, and
   wherein the resistive element layer is selectively coupled to and decoupled from the engineered substrate such that the resistive element layer conducts heat to the engineered substrate when the resistive element is coupled to the engineered substrate and such that the resistive element layer is thermally isolated from the engineered substrate when the resistive element layer is decoupled from the engineered substrate to define a gap therebetween.

2. The layered heater system according to claim 1, wherein the core defines a honeycomb structure.

3. The layered heater according to claim 2, wherein the honeycomb structure comprises a plurality of cells having the plurality of walls, and a thickness of the plurality of walls is tailored for specific heat transfer requirements.

4. The layered heater according to claim 2, wherein the honeycomb structure comprises a plurality of cells having a peripheral size, and the peripheral size is tailored for specific load carrying capability.

5. The layered heater system according to claim 1, wherein the upper face sheet and the lower face sheet comprise a stainless steel material.

6. The layered heater system according to claim 1, further comprising a heater plate and a dielectric layer formed on the heater plate, wherein the resistive element is formed on the dielectric layer.

7. The layered heater system according to claim 1, further comprising at least one temperature sensor.

8. The layered heater system according to claim 7, further comprising a thermowell disposed within the core to receive the temperature sensor.

9. The layered heater according to claim 1, further comprising:
   an electrical interconnect for use in connecting the terminal pads to a power supply comprising:
      a dielectric enclosure defining an inner cavity having a central portion; and
      a contact member disposed within the central portion of the inner cavity of the dielectric enclosure, the contact member being adapted for electrical contact with the terminal pad.

10. The layered heater system according to claim 9, wherein the electrical interconnect is in a high voltage vacuum environment.

* * * * *